(No Model.)
F. ATHERTON & M. T. BENTLEY.
HOSE COUPLING.
No. 378,566. Patented Feb. 28, 1888.
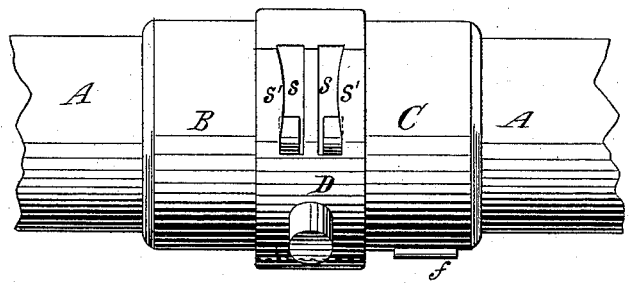
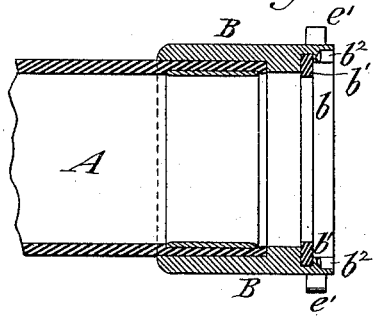
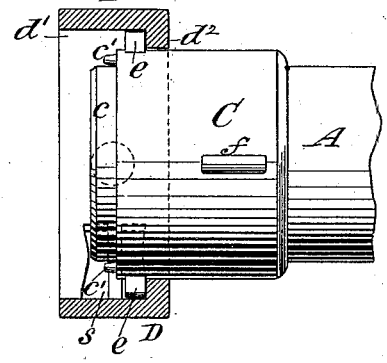
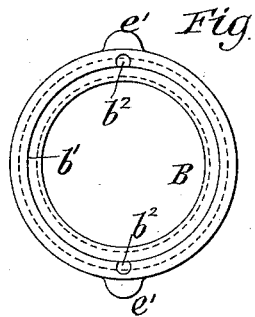
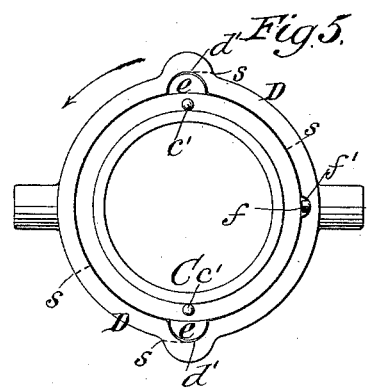
Witnesses:
Inventors:
Frank Atherton
Manton T. Bentley
by their Attys
Brown & Hall

UNITED STATES PATENT OFFICE.

FRANK ATHERTON AND MANTON T. BENTLEY, OF PATERSON, NEW JERSEY.

HOSE-COUPLING.

SPECIFICATION forming part of Letters Patent No. 378,566, dated February 28, 1888.

Application filed August 25, 1887. Serial No. 247,818. (No model.)

*To all whom it may concern:*

Be it known that we, FRANK ATHERTON and MANTON T. BENTLEY, both of Paterson, in the county of Passaic and State of New Jersey, have invented a new and useful Improvement in Hose-Couplings, of which the following is a specification.

Our invention relates to hose-couplings which in some respects are similar to that illustrated in our Patent No. 333,913, granted January 5, 1886. In that coupling the two members which are respectively secured to hose-sections are provided upon their exteriors with lugs which are in line when they are placed in position to form a butt-joint, and the external band which is fitted upon the coupling has channels extending lengthwise of it to receive these lugs, and has circumferential slots extending from the channels, and which provide for the turning of the band upon the coupling members, so as to shift the slots in the band over the lugs in a circumferential direction, and thus hold the two members together. In our aforesaid patent each coupling is provided with two slotted bands, one band being upon each half of the coupling, and although the slots are very slightly oblique, so as to draw the members of the coupling together by the turning of the band, yet the band by jars or shocks is sometimes liable to slip backward and release the parts of the coupling.

In carrying out our present invention we construct the slots in a single external band, so that by first turning the band the members of the coupling are drawn closely together, and by continued turning the said members are very slightly relieved, such relief being not sufficient to permit leakage, owing to a rubber packing being employed and being sufficient to prevent the outside band from turning backward by jars or shocks, so as to permit the release of the two parts of the coupling.

In the accompanying drawings, Figure 1 is an external view of a coupling embodying our invention, the two members being locked together. Fig. 2 is an axial section of one coupling member with a portion of hose attached. Fig. 3 is a side view of the other coupling member, with a portion of hose and an axial section of the outside band; and Figs. 4 and 5 are respectively end views of the parts shown in Figs. 2 and 3.

Similar letters of reference designate corresponding parts in all the figures.

A designates the sections of hose, which are respectively secured in bands or members B C, and these bands or members are locked together by means of an outside band, D, as more fully hereinafter described. As here represented, the coupling member C forms a slip-joint with the coupling member B, the said member C having an annular projection, $c$, at its end, which is adapted to enter an enlargement, $b$, in the member B and to impinge against the packing $b'$ therein.

We have shown the member C as provided with dowels $c'$, which enter holes or sockets $b^2$, formed in the member B, and which insures the two members being always placed truly in alignment, so that lugs $e\ e'$, formed upon the exterior of the two members, will be truly in line lengthwise of the coupling. The band D we have shown as having at diametrically-opposite points channels $d'$, which extend lengthwise of the coupling, and which are of a shape to receive the lugs $e\ e'$. Consequently it will be seen that when the two coupling members are placed in true alignment the band D can be slipped forward over the pairs of lugs $e\ e'$ until the flanges $d^2$, which close the inner ends of the channels $d'$, abut against the lugs $e$.

As best shown in Fig. 1, the band D has pairs of arc-shaped slots $s$, which extend from the two channels $d'$ in the same direction, as shown by dotted lines in Fig. 5, and the form of one pair of slots is shown clearly in Fig 1. After the band D has been slipped forward to the position shown in Fig. 3 it is turned in the direction indicated by the arrow in Fig. 5, and thereby the slots $s$ of each pair are traversed circumferentially of the coupling over the lugs $e\ e'$ upon that side of the coupling, and thus the two members of the coupling, B C, are locked in secure engagement. We have here shown the back sides of the two slots $s$ as convex, as shown at $s'$ in Fig. 1, so that as the band D is first turned to shift the slots $s$ over the lugs $e\ e'$ these convex sides $s'$, by bearing against the lugs, tend to draw the two members of the coupling together and tightly press the packing $b'$ which is between them, and as this turning movement continues the points in the sides $s'$ which have greatest convexity pass the lugs $e\ e'$, and the pressure upon the lugs correspondingly relaxes or is relieved, thereby permitting the coupling members B C to move very slightly away from each other, and thus prevent the band from accidentally being turned backward by jars or shocks or otherwise. This slight relief of the coupling members in their locking action has no tendency to cause the leaking of the coupling, because the packing $b'$ has been so tightly compressed in the locking action that it may be relieved of a small amount of pressure, and will by its elasticity swell sufficiently to prevent leakage.

It is desirable to prevent the band D from shifting circumferentially when it is out of action, so that it will always be held with its channels $d'$ in alignment with the lugs $e$ on the member on which the band is a fixture. We therefore provide a rib or projection, $f$, upon the part C, and we provide in the band D an internal groove, $f'$, which, by fitting over the rib $f$, holds the band against turning. As soon as the channels $d'$ strike the lugs $e$, the band is held by said lugs against turning, and hence it may pass clear of the rib $f$; but in slipping the band back to the right hand of Fig. 3 the groove $f'$ passes over the rib $f$ before the channels $d'$ are slipped off the lugs $e$, and hence the band is at all times held against turning.

We are aware of patent to Symes and Bouchtel, No. 343,089, dated June 1, 1886, in addition to our former patent above referred to. In both said patents the engaging-surfaces of the band and coupling-sections are inclined to tighten up the sections as the band is turned. We do not desire to include a simple inclination of these surfaces, or either of them, in our invention; but the slots $s$, having their walls $s'$, which are distant from each other, formed convex, is the essential element of our invention. This convex form gives those surfaces in reality a double or reverse inclination, so that when the band D is turned the slots $s$, by engaging the lugs or ears $e\ e'$, will first tighten the sections B C together, and then at the end of the turning movement of the band will relieve the sections B C, thus permitting them to spring very slightly apart, so that they will not exert any tendency whatever to turn the band accidentally in a reverse direction—that is to say, in a direction to unlock or disconnect the sections.

What we claim as our invention, and desire to secure by Letters Patent, is—

The combination, in a hose-coupling, of the members B C, which are to be secured to the hose-sections, and which are fitted together with dowels and have lugs $e\ e'$, which are then in line, a packing between the members, and the band D, having the lengthwise channels $d'$, receiving the lugs and closed by flanges at the inner ends, and also having the pairs of arc-shaped slots $s$, leading circumferentially from the channels for receiving the lugs, and having their back walls convex, so as to tighten together and subsequently relieve the members by turning the band, substantially as herein described.

FRANK ATHERTON.
MANTON T. BENTLEY.

Witnesses:
T. C. SIMONTON, Jr.,
ALFRED CREW.